United States Patent

[11] 3,613,817

| [72] | Inventors | Emmett F. Glass<br>Akron;<br>Bruce D. Schwalm, Leola, both of Pa. |
|---|---|---|
| [21] | Appl. No. | 871,846 |
| [22] | Filed | Oct. 28, 1969 |
| [45] | Patented | Oct. 19, 1971 |
| [73] | Assignee | Sperry Rand Corporation<br>New Holland, Pa. |

[54] LINKAGE MECHANISM ACTUATING HYDROSTATIC TRANSMISSIONS SEPARATELY DRIVING THE FRONT WHEELS OF A TRACTOR
12 Claims, 9 Drawing Figs.

| [52] | U.S. Cl. | 180/6.48 |
| [51] | Int. Cl. | B62d 11/04 |
| [50] | Field of Search | 180/6.48, 77 H, 6.5 V; 74/471 XY |

[56] References Cited
UNITED STATES PATENTS

| 644,853 | 3/1900 | Fahl | 180/6.5 V X |
| 2,941,609 | 6/1960 | Bowers | 180/6.48 |
| 3,208,609 | 9/1965 | Davis | 180/6.48 |
| 3,431,993 | 3/1969 | Case | 180/6.48 |

*Primary Examiner*—Arthur L. La Point
*Assistant Examiner*—Richard A. Bertsch
*Attorneys*—Joseph A. Brown, John C. Thompson, James J. Kennedy and George C. Bower ABSTRACT: A linkage mechanism actuates two hydrostatic transmissions separately driving the two front wheels of a tractor and has a spring-biased operating lever pivotally and rotatably mounted on the main frame and two links connected between a single-bearing ball on the lever to separate bearing balls on respective pintle arms of the hydraulic transmission pumps. The lever and links actuate the pintle arms over forward and reverse. Releasable holding means retain the lever at any given forward drive position and, on release, the spring bias returns the lever to neutral as braking is applied to the driving hydraulic motors. Pivotally mounted neutral stop arms prevent the pintle arms from moving from forward to reverse drive and are raised clear of the pintle arms by a pedal pivotally coupled to the neutral stop arms to permit reverse movement.

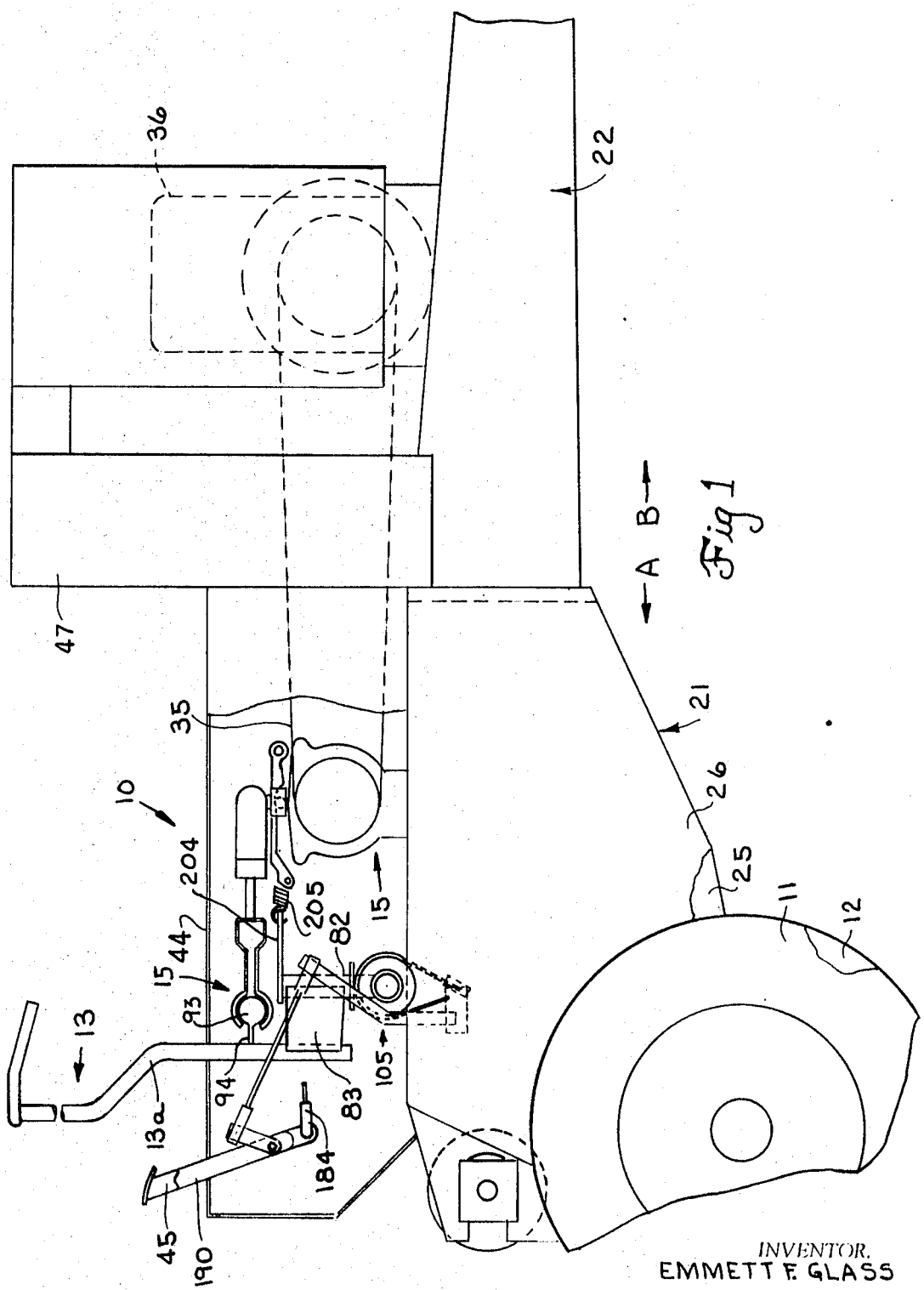

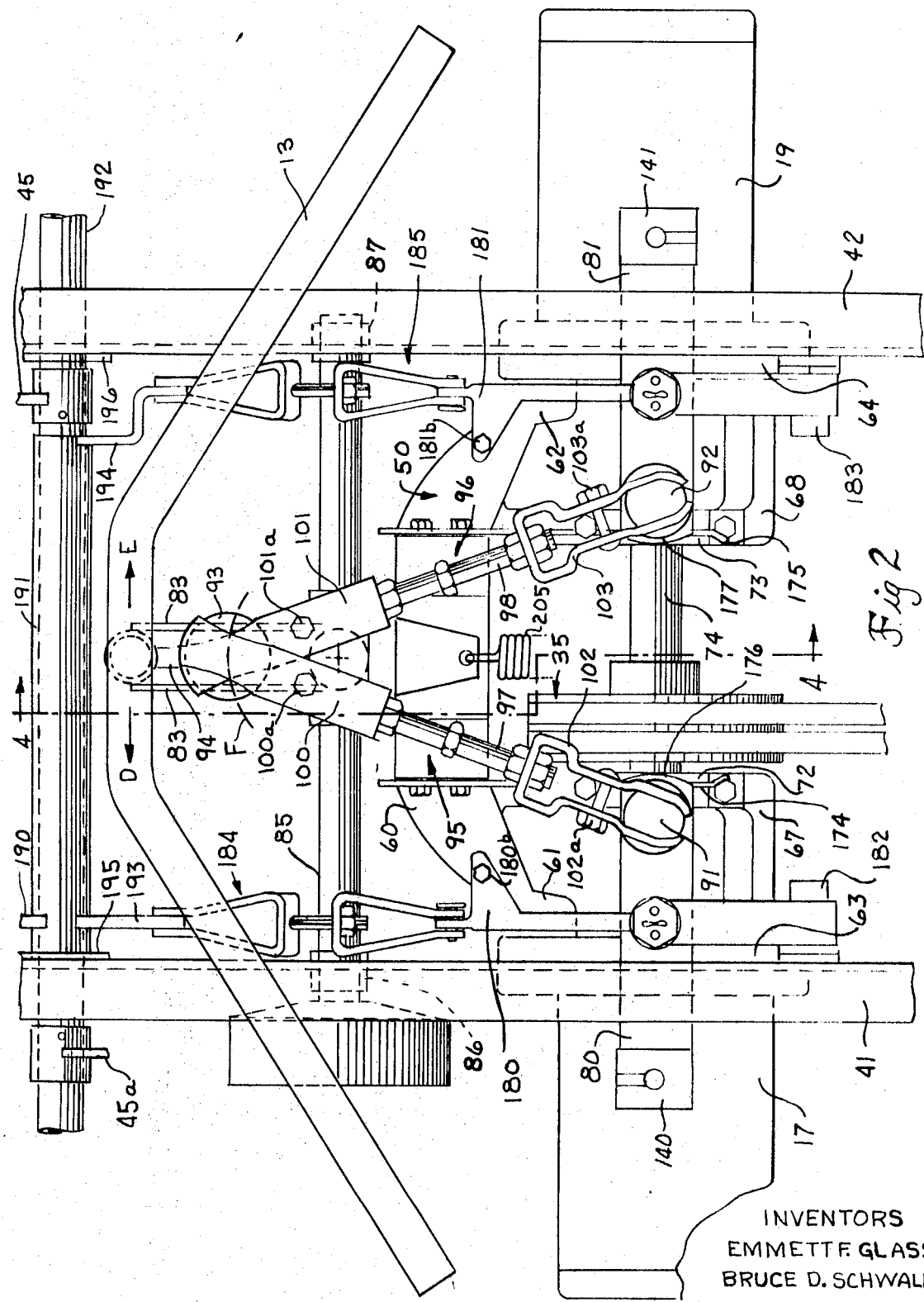

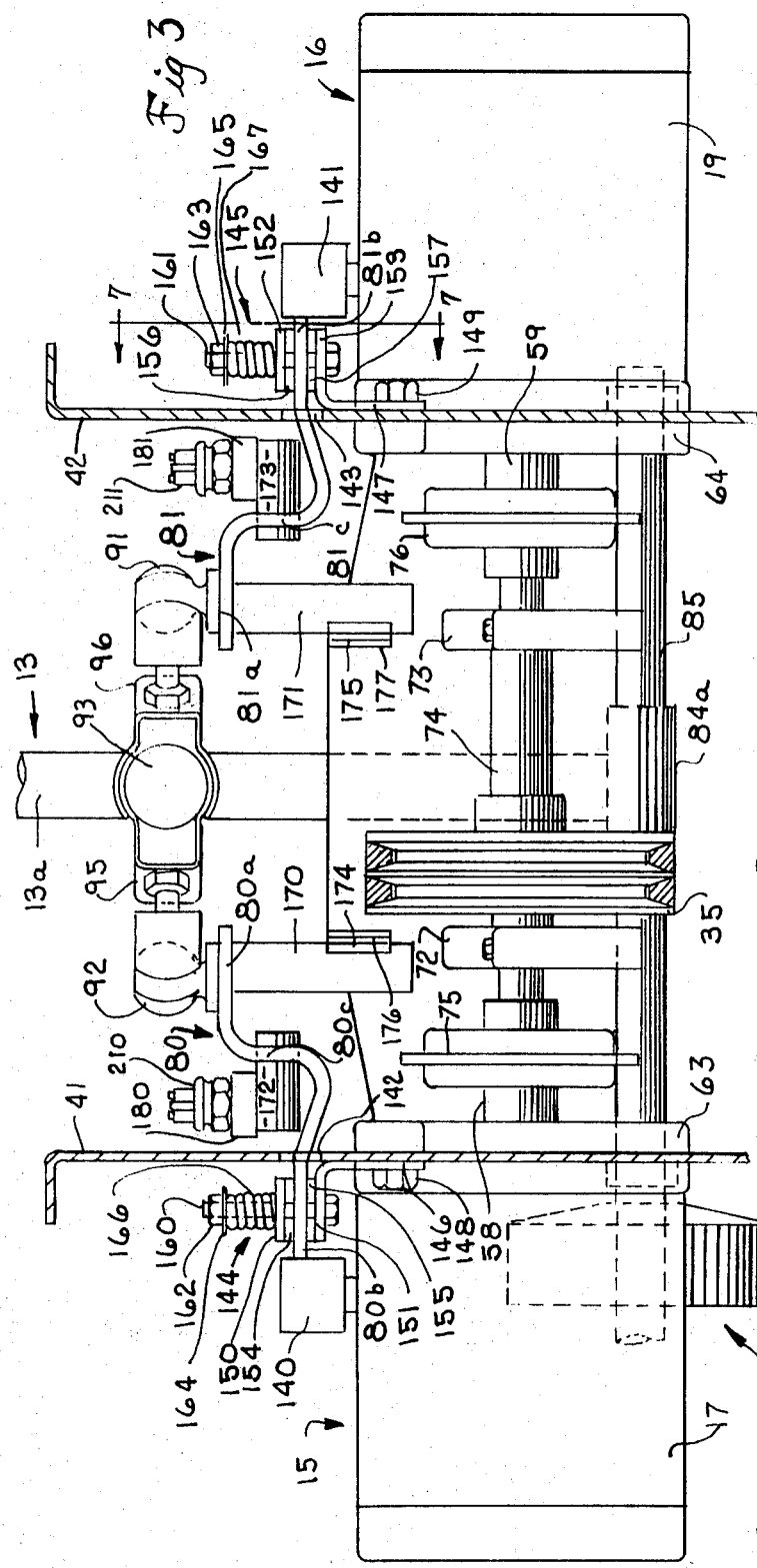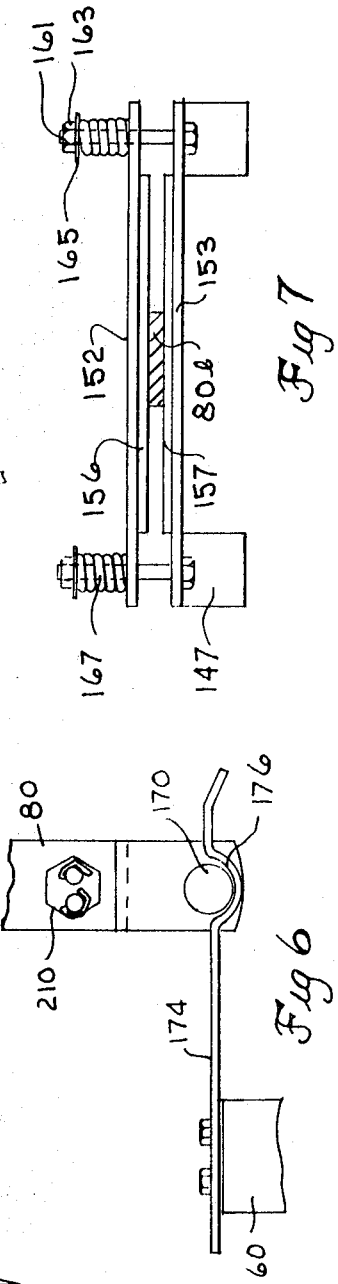

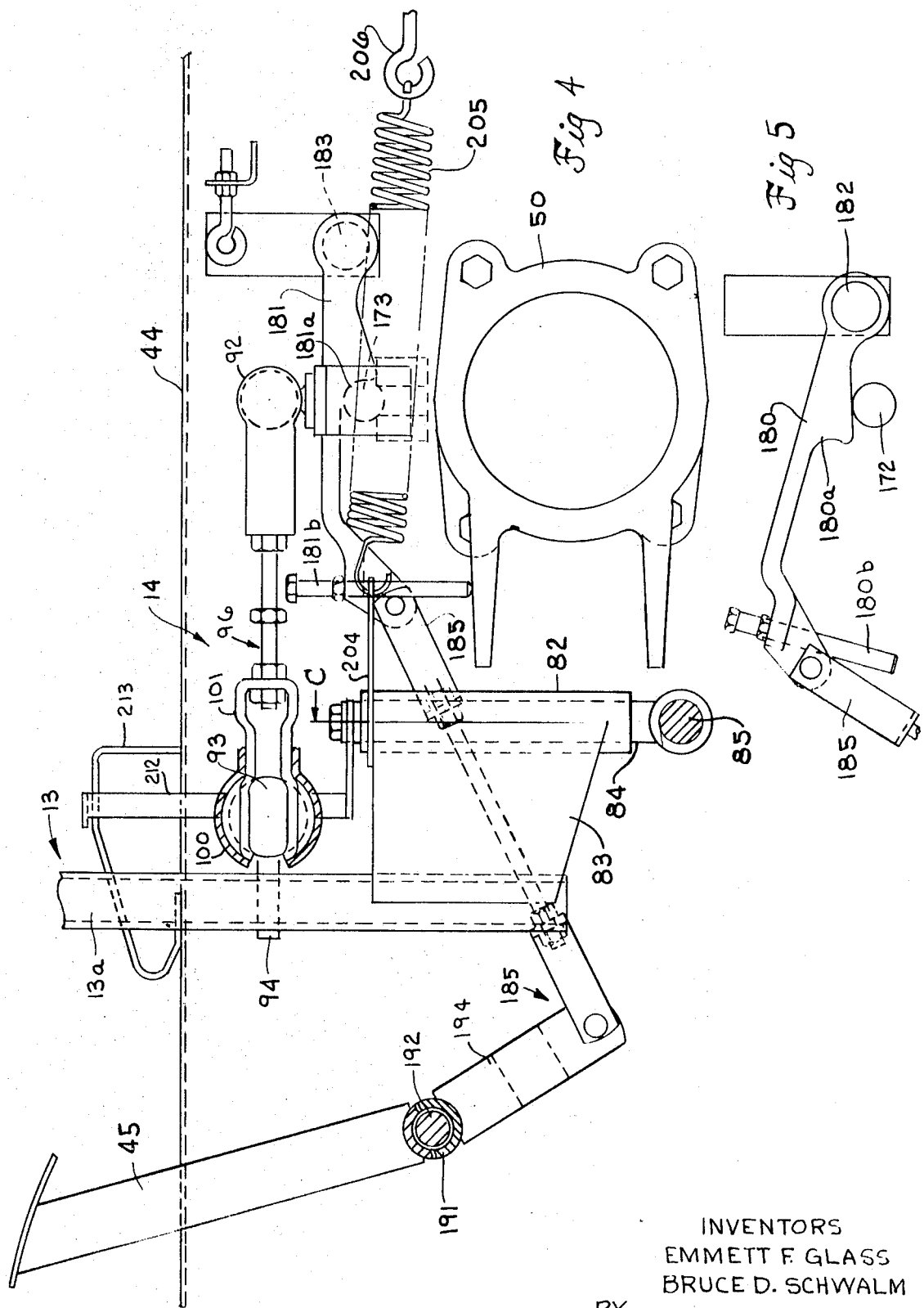

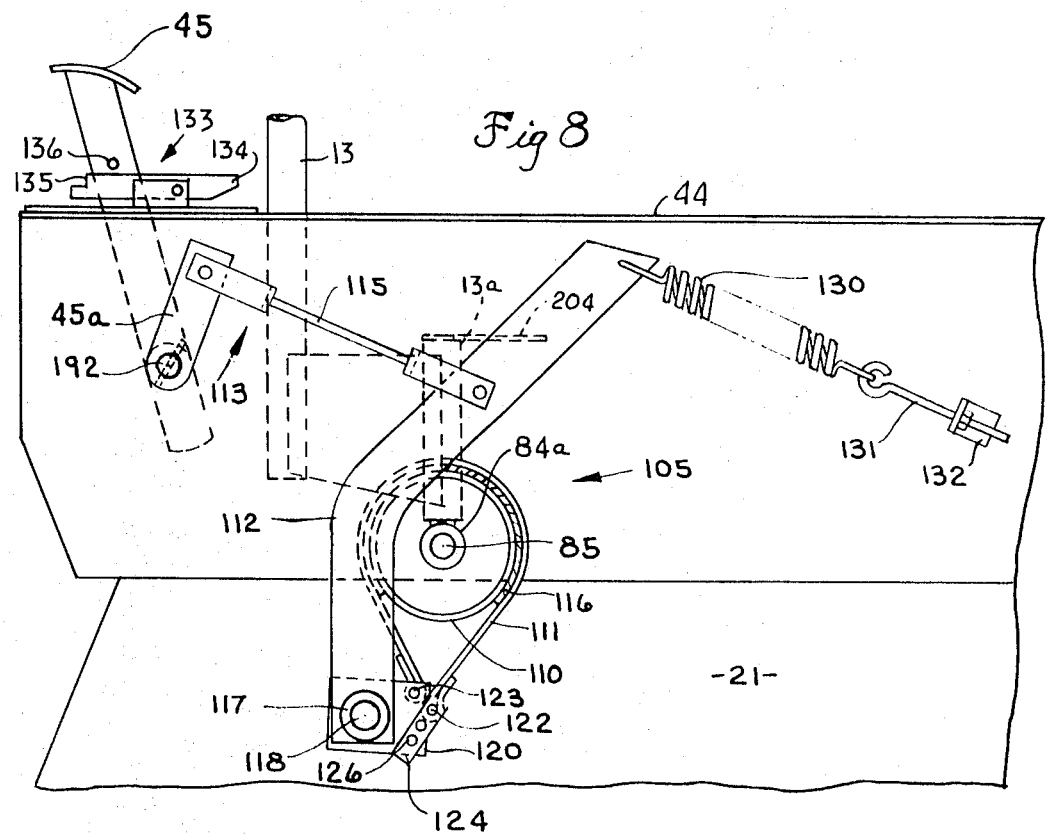
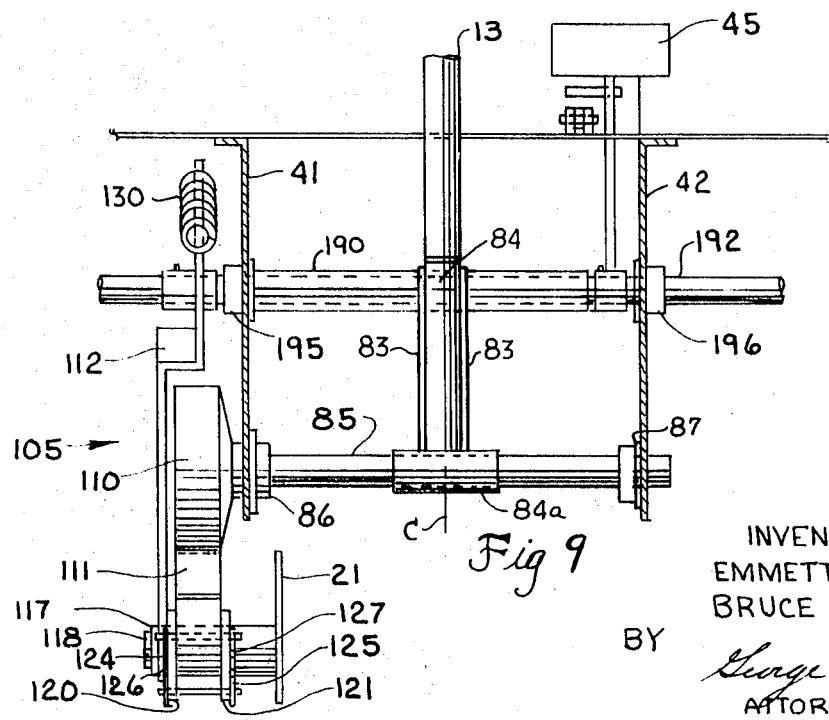

LINKAGE MECHANISM ACTUATING HYDROSTATIC TRANSMISSIONS SEPARATELY DRIVING THE FRONT WHEELS OF A TRACTOR

RELATED APPLICATIONS

This relates to patent application, Ser. No. 816,001 filed on Apr. 14, 1969, By Emmett F. Glass, Edmund O. Howell and Bruce D. Schwalm and entitled "Speed and Direction Control Mechanism for a Tractor Having Two Separately Driven Front wheels."

BACKGROUND OF THE INVENTION

This invention relates to manually operated means for controlling two hydraulic transmissions separately driving the two front wheels of a tractor and is directed particularly to the linkage mechanism having a single-operating lever setting the position of the pintle arms of the hydrostatic transmissions pumps.

For operating agricultural equipment there are the standard tractors with large drive wheels in the rear and the specially designed tractors with the large drive wheels in the front. These latter tractors are used in self-propelled equipment and carry large mowers, headers or the like on front. In many of these special tractors the front wheels are separately driven from the engine through hydrostatic transmissions. The tractor is steered by creating a difference in the speed between the front drive wheels. The hydrostatic transmissions comprise two sets of hydraulic pumps and motors. The pumps are connected to and driven by the tractor engine. The transmission of power is controlled by varying the position of the pintle arms on the pumps.

In previous control systems the pintle arms have been actuated by separate levers. The tractor driver independently adjusts the levers to attain the desired movement of the tractor. The levers are mechanically held at full speed but at less than full speed they are held in a driving position by hand. For long continuous operation this is tiresome and burdensome. Linkage mechanism has been invented which actuated both pumps in response to a single-operating lever which can be actuated by one hand or by two hands and mechanically held in position at any speed. The lever is moved forward and rearward to set the forward or rearward speeds of the tractor and turns left or right to create a differential between the speeds of the two wheels for turning the tractor. This mechanism satisfactorily varies the hydrostatic transmissions and controls the movement of the tractor. The single control lever makes it easier to operate the tractor over long periods. However, additional improvements were desirable to further improve the ease and smoothness of operation. In hydrostatic transmissions the pumps can change to motors due to the forward inertia of the vehicle or to a downhill grade. When this occurs it is difficult to smoothly pull the operating lever back to the neutral position against the hydraulic pressure.

Another feature of the previous single control lever linkage mechanism is the equal movement of the pintle arms on movement of the control lever. This equal movement is necessary for the forward and reverse driving of the tractor. Each wheel receives the same amount of power and rotates at the same speed for linear forward or rearward movements. However, on turning the tractor, the equal movement of the pintle arms in opposite directions causes a substantial differential in the speeds between the wheels and turns the tractor too sharply for a small movement of the lever. For a smoother turning of the tractor, it is desirable to reduce this sensitivity.

A further feature of the previous linkage mechanisms is that the operating lever could be moved rearwardly from forward drive into reverse drive. The tractor driver in stopping the equipment may not necessarily sense that the pintle arms are at neutral and pull the operating lever through neutral into reverse. This results in an uneven stopping of the tractor and is, therefore, desirable to provide a positive stop of the pintle arms at neutral.

It is, therefore, the purpose of this invention to provide a linkage mechanism for operating two sets of hydraulic transmissions driving opposite wheels of a tractor that more smoothly turns and stops the tractor.

OBJECTS AND SUMMARY OF THE INVENTION

An object of this invention is to provide a linkage mechanism that more smoothly and gradually controls the stopping of a tractor having front wheels separately driven by hydraulic transmissions.

Another object of this invention is to provide a linkage mechanism operated by a single lever that equally moves the pintle arms of hydrostatic pumps in forward and reverse and can equally move the pintle arms in the turning of the lever.

Another object of the invention is to provide a linkage mechanism controlling the forward and reverse driving of hydrostatic transmissions that limits operation to forward speeds except on removal of the limits.

Another object of the invention is to provide a linkage mechanism that is simple and inexpensive to manufacture and provides a smooth control of the forward speeds and turning of the tractor.

In summary this invention is a linkage mechanism comprising two links, a common bearing ball pivot mounted on a rotatable and pivotable operating lever in offset relation to the axis of rotation of the lever with the links connected between the common pivot and respective pivots on the pintle arms of hydrostatic transmissions pumps.

Other and further objects of this invention will be apparent from the following specification and the appended claims taken in connection with the drawings which illustrates a preferred embodiment of the invention.

BRIEF DESCRIPTION OF THE DRAWINGS

FIG. 1 is a side view of a tractor with separately driven front wheels.

FIG. 2 is a fragmentary top view of the operating lever linkage system and pumps.

FIG. 3 is a rear view taken along lines 3—3 of FIG. 2.

FIG. 4 is a side view of the linkage taken along the lines 4—4 of FIG. 2.

FIG. 5 is a fragmentary side sectional view of the left stop link in a raised position, taken along lines 5—5 of FIG. 2.

FIG. 6 is a fragmentary top view illustrating the post on the pintle arm engaging the neutral notch of a detent.

FIG. 7 is a fragmentary side view of a friction grip on the pintle arm of the right hydraulic pump taken along lines 7—7 of FIG. 3.

FIG. 8 is a side view of the operating lever retention means.

FIG. 9 is a fragmentary sectional view of the operating lever retention means and release and brake means taken along lines 9—9 of FIG. 8.

DETAILED DESCRIPTION OF THE PREFERRED EMBODIMENT

INTRODUCTION

The front wheels 11,12 of the tractor 10 are independently driven in a forward direction A or a rearward direction B by the hydrostatic transmissions 15,16 of which only the pumps 17 and 19 (FIG. 3) are shown. The tractor is turned either left or right by a speed differential between the wheels or by reversing one wheel in relation to the other. This operation is controlled by the backward or forward movement and by the clockwise or counterclockwise turning of the operating lever 13 through a linkage mechanism 14.

The tractor 10 has a main frame 21 and an engine-supporting frame 22 (FIG. 1) extending from the rear of the main frame. The front wheels 11,12 are attached to the casings of the main frame by wheel housings 25,26 (FIG. 6) and support the main weight of the tractor and of a header (not shown) mounted on the front of the main frame by linkages (not shown). A tail wheel (not shown) is rotatably mounted at the apex of the engine-supporting frame 22 to carry the weight at the rear. The engine 36 drives the hydrostatic transmissions through the belt and pulley drive 35 (FIGS. 1-3) and the transmissions drive the front wheels through chain drives (not shown) in the casings.

FRAME MEANS

The main frame 21 has an upper portion with two center longitudinally extending frame beams 41,42 (FIGS. 2 and 3). On top of the upper portion is the operator's deck 44. The operator's lever 13, reverse release pedal 190 and brake pedal 45 extend therethrough (FIGS. 1, 4 and 8).

The front wheels 11,12 drive the tractor and carry the main portion of the weight of the tractor and of the header. The engine 36 is intermediately mounted on the engine-supporting frame 22 and a casing 47 is mounted adjacent the main frame for housing a gasoline tank and other components of the tractor (not shown). The front guard rails, operator's seat, control pedestal, mounting steps and other elements have been omitted. The operator can move the operating lever 13 forwardly, rearwardly and turn it right or left for controlling the speed and direction of movement of the tractor. Between the two center longitudinally extending frame beams 41, 42 is a U-shaped casting 50 (FIG. 2) fastened to the frame members for forming a support for the pumps 17,19 of the universal hydrostatic transmission means 15,16.

DRIVE MEANS

The front wheels 11,12 are driven by the engine 36 mounted on the engine-supporting frame 22 through the belt and pulley drive 35, the hydraulic transmissions 15,16, chain drives (not shown) connected to the front wheels 11,12 respectively. In the hydraulic transmissions the hydraulic pumps 17,19 are connected to the hydraulic motors (not shown) by a conventional oil pressure pipe system for circulating the hydraulic fluid. The hydraulic pump support 50 has a transversely extending central portion 60 with arms 61,62 extending from opposite ends. The arms curve to the longitudinally extending flanges 63,64 which attach to the facing sides of the center frame members 41,42 respectively. The flanges 63,64 have openings for receiving the ends of the hydraulic pumps and the input shafts 58,59 (FIG. 3). The shafts extend coaxially towards one another and the pumps 17,19 are secured to the flanges 63,64, respectively. L-shaped members 67,68 (FIG.2) extend from the base of the arms to the flanges and having means 72,73 for holding the bearings (not shown) supporting the shaft 74 on which the driven pulley of the engine belt and pulley drive 35 is mounted. The shaft 74 is coupled at the opposite ends to input shafts 58,59, respectively, of the pumps by flexible couplings 75,76. Thus the engine 36 drives the hydraulic pumps 17,19 of the hydraulic transmission which, in turn, drive the wheels 11,12 through hydraulic motors.

ACTUATING MECHANISM

The hydraulic pumps 17,19 have pintle arms 80,81 which are attached to the swash plates of the pumps for shifting the angular position of the swash plates to vary the output of the pumps. The pintle arms 80,81 swing forward and backward about the neutral transverse position shown in FIG. 2. Forward movement of the pintle arms rotates the front wheels to drive the tractor in the forward direction A. The further the pintle arms are swung forward greater is the speed of rotation of the wheels. Movement of the pintle arms rearward drives the tractor in the reverse direction B and the further the pintle arms are moved to the rear the greater the rearward speed. A speed differential may be created by moving one pintle arm more than the other so that the arms are at different angles to the neutral position. This produces a turning action in the direction of the slower moving wheel. Thus the tractor may be turned to the left or right depending upon degree of differential of the pintle arms.

The pintle arms 80,81 are actuated by a linkage mechanism 14. The tractor driver actuates the linkage mechanism 14 by means of the operating lever 13. The operating lever comprises a post 84 and a vertically extending portion 13a with a sleeve 82 (FIG. 4) secured thereto by strips 83 on opposite sides of the shaft and sleeve. The sleeve 82 is slidably mounted on a post 84 to rotate about the longitudinal axis C of the post. The post 84 is fixedly attached to the horizontal pivot shaft 85 by the cylindrical portion 84a. The shaft 85 is rotatably mounted in bearings 86,87 (FIG. 9) attached to the center frame members 41,42, respectively. Thus when the operating lever 13 is moved forward and backward the post 84 is rotated in a vertical plane about the horizontal axis of the pivot shaft 85. With the sleeve 82 rotatably mounted on the post the operating lever may be turned in the clockwise or counterclockwise direction about the longitudinal axis C on the post which is moved in the vertical plane on the forward and rearward movement of the operating lever.

The vertically extending portion 13a has a ball 93 (FIGS. 2, 3 and 4) secured to the portion 13a by member 94. The member is on the side of the ball 93 opposite from the pintle arms 80,81 so that the surface of the ball facing the pintle arms is unobstructed. The balls 91,92 are on the upper side of the pintle arms 80,81 and are connected to the ball 93 by the links 95,96 (FIG. 2). The ball 93 is positioned forwardly of the axis of rotation C of operating lever. The portion 13a is forwardly of the sleeve 82 and post 84 so that the links 95,96 are free to swing from one side to the other as the ball 93 moves through the arc about the axis C. The clamps 100,101 overlap and pivot about the same diametric axis of the ball 93. On swinging of the operating lever to the left in direction D, when in a forward speed position, the ball 93 moves in the arc F in the same direction. The link 95 moves the pintle arm 80 a greater distance to the rear than the link 96 moves the pintle arm 81. This slows wheel 11 down while maintaining the wheel 12 at about the same speed. As seen in the drawings the link 96 is moving across the turning axis C so that the center of pivot on the ball 92 of the link 96 is in line or substantially in line with the ball 91 and axis C. Thus the link 96 is turning about the ball 92 and not moving the pintle arm 81. On the other hand the arc F of the bearing ball 93 turns toward the pintle 80 and the link 95 is at an angle of about 100° therewith, the rearward movement of the ball 93 is thus transmitted to the pintle arm 80.

The links 95,96 comprise threaded shafts 97,98, resilient clamps 100,101 pivotally attached to the ball 93 and clamps 102,103 pivotally attached to balls 91,92, respectively. The clamps are securely fastened in rotatable relation to the respective balls by nuts 100a, 101a, 102a, 103a. The links at the pintle arms are on opposite sides of the vertical longitudinal plane containing the longitudinal axis C of the post 84 and converge for attachment to the ball 91 in the plane when the operating lever is not rotated from the midposition. As the operating lever 13 is moved forward the links 95,96 rotate the pintle arms of the pumps 80,81 forwardly and when the operating lever is moved rearwardly the pintle arms 80,81 are rotated to the rear. Thus the pintle arms are moved forwardly over a range of speeds or moved rearwardly over a range of speeds.

Thus the tractor driver with a single control means may drive the tractor forwardly over a range of speeds or rearwardly over a range of speeds or turn the tractor to the left or right in a forward or rearward direction.

A pointer 212 is mounted on the top of the post 84 and extends above the operator's deck 44. As the lever 13 is tilted forward and rearward the position of the lever is indicated compared with the dial 213. The driver can return the lever 13 to the selected speed for each run across a field.

Pintle Arms and Dampening Means

The pumps 17 and 19 have pivotal means 140,141, respectively, connected to the swash plates (not shown) of the pumps. The pintle arms 80 and 81 are attached to these pivotal means to swing through facing arcs. The arms 80,81 have generally S-shapes with horizontal portions 80a, 81a and 80b and 81b connected by generally vertical portions 80c, 81c. The horizontal portions 80b and 81b are attached to the pivotal means 140,141 and extend through slots 142, 143 in the respective beams 41,42 to position the horizontal portions 80c, 81c between the beams.

Dampening means 144,145 (FIGS. 3 and 7) are positioned between the pivotal means 140,141 and the respective beams 41,42 and have support brackets 146,147 secured to the opposite sides of the beams 41,42 by fastening means 148,149, respectively. The dampening means have upper and lower strips 150,151 and 152,153 vertically spaced with friction strips 154,155 and 156,157 mounted on facing surfaces to grip the horizontal portion 80b and 81b. The lower strips 151,153 are attached to the brackets 146,147, respectively, and posts 160,161 extend upwardly through the upper strips 150, 152 at the ends of the dampening means 144,145 and have nuts 162,163, washers 164,165 and springs 166,167, respectively, to resiliently press the upper strips against the pintle arms. Sufficient spring pressure is applied to permit the pintle arms to slidably move, yet dampen and prevent any chattering action of the pintle arms.

The inner horizontal portions 80a, 81a are higher than the outer horizontal portions with the bearing balls 91,92 mounted on the upper side of the pintle arms and downwardly extending posts 170,171 are mounted on the underside. On the vertical intermediate portions 80c, 81c, pins 172,173 are welded thereto and extend horizontally towards the respective beams 41 and 42.

Springlike strips 174,175 are mounted on the central portion 60 of the support 50 and extend rearwardly in vertical planes with notches 176, 177 to form detents to receive the posts 170,171, respectively, thereby indicating or sensing when the pintle arms 80,81 are in a neutral position.

The switches 210,211 on the arms 180,181 have projections extending through the respective arms and are normally open to prevent starting of the engine when the transmissions are in drive condition. In the neutral position the pins 170,171 engage the pins to close the switches permitting starting of the engine 36.

Neutral Stop Arms and Actuating Mechanism

Neutral stop arms 180,181 extend longitudinally and are pivotally attached to the facing sides of the beams 41 and 42 by the pivot studs 182, 183 (FIG. 2) securely fastened thereto. The neutral stop arms 180,181 are positioned above the pins 172,173 and have notches 180a, 181a facing forwardly to receive the pins 172, 173 on rearward movement from a forward-driving position. The neutral stop arms 180,181 extend forwardly of the full forward arc of the pins. At the forward end the arms are connected to a foot pedal 190 by links 184,185. The foot pedal is fixedly attached to a tubular shaft 191 rotatably mounted on the main brake shaft 192. The links 184, 185 are pivotally connected to the neutral stop arms 180, 181 at the forward ends to the tubular shaft 191 by cranks 193,194 and extending generally radially and securely fixed to the tubular shaft 191. The brake shaft 192 is rotatably mounted in bearings 195,196 in the beams 41,42.

The neutral stop arms 180,181 are generally horizontal above the pins 172,173 with the notches 180a, 181a in the lower position for engagement by the pins 172,173 on a rearward movement of the pintle arms 80,81 to the neutral position. In order to drive the tractor rearwardly, the pedal 190 is depressed and rotated lifting the neutral stop arms in the position shown in FIG. 5 so that the pins 172,173 can move rearwardly. The pintle arms are moved to reverse the rotation of the pumps and driving motors. When the pintle arms are in reverse, the pedal may be released and the arms will ride on top of the pins. On forward movement into forward drive the arms fall to stop positions. The posts 170,171, recess in the detents 176,177 on the strips 174,175 to indicate to the driver that the pintle arms are passing through the neutral position thus giving to the driver a feel for when the pintle arms are passing from reverse to forward or from forward to reverse.

Operating Lever Position Control Means

The center beam 41 and pivot shaft 85 has holding means 105 (FIG. 8) mounted thereon to retain the operating lever in any forward or rearward position set by the tractor operator.

The holding means 105 may be released to permit movement of the operating lever 13. The sleeve 82 (FIG. 4) has a horizontal bracket 204 perpendicular thereto and extending rearwardly on the opposite side from the plates 83. A helical spring 205 is attached at its forward end to the bracket and at its rearward end to an eyelet 206 (FIG. 4) attached to the frame 21 by means not illustrated.

The holding means (FIGS. 8 and 9) generally comprises a brakedrum 110, band 11 and lever 112. The release means 113 comprises the pedal 45, shaft 192, arm 45a and link 115 connected to the lever 112. The brakedrum 110 is mounted on the end of the pivot shaft 85 projecting through the left center beam 41. The brake band 111 with the brakeshoe 116 extends around the periphery of the brakedrum 110 with the ends connected to the pivotally mounted lever 112. The lever 112 has a sleeve 117 rotatably mounted on the shaft 118 which is fixedly secured to the lower main frame 21. The sleeve 117 has two axially spaced brackets 120,121 fixedly attached thereto. The ends of the brake band 111 fit between the brackets and have pine 122,123 extending through the end for securing the brake band 111 to the lever 112. Adjustable links 124,125 with a plurality of holes 126,127 may be positioned between the lower end of the brackets and the brake band. On rotation of the lever in a rearward direction the brake band 111 is drawn in tight friction engagement with the brakedrum 110. The lever 112 extends at an angle above the brakedrum and a helical spring 130 is connected between the upper end of the lever 112 and the upper frame 22 of the tractor by the bolt 131 and bracket 132. The lever 112 curves around the top of the drum and is held in friction engagement with the drum by helical spring 130. This frictional engagement is sufficient to hold the operating lever against usual forces but may be overcome by the operator without actuation of the release pedal.

The brake pedal 45 is held by the brake lock 133. The brake lock includes a pin 136 fitting into the notch 135 on the pivotally mounted brake lever 134 to hold the brake forward in the released condition. The shaft 192 is rotatably mounted in bearings 195,196 mounted in beams 41 and 42, respectively, and extends across the tractor. Brake means (not shown) on the hydraulic motors are connected to and actuated by the shaft to slow the motors on reduction of speed of the tractor. Thus on release of the shaft 85 the spring 205 draws the lever 13 to the neutral position and the tractor brakes are applied on further rotation of the pedal 45.

OPERATION

The engine 36 drives the pulley on the shaft 74 to supply power to the pumps 17 and 19. With the pintle arms 80 and 81 in the neutral position as shown in FIG. 2, there will be no movement of the tractor. To drive the tractor in a forward direction the operator pushes the lever 13 forward swinging the pintle arms 80 and 81 forward through the bearing ball 93, links 97,98 and the bearing balls 91,92 on the respective pintle arms. The arms swing through equal arcs so that equal power is supplied to the wheels 11,12 and the tractor moves forward. The spring 205 which is under tension with the pintle arms 80 and 81 in the neutral position is stretched further. The lever 13 is held in the forward position by the holding means 105 which has a brakedrum 110 fixedly attached to the shaft 85 around which the operating lever pivots forwardly and rearwardly. The spring 130 holds the brake band 111 in gripping relation with the drum 110. The operating lever 13 is moved forwardly against this friction and held in position by the retention means. To slow the tractor down or to stop the tractor the right-hand brake 45 is pressed forwardly to release the holding means 105 by loosening the brake band 111 on the drum 105 and the spring 205 will draw the operating lever 13 rearwardly to the neutral position. The pins 172 and 173 engage the notches 180a and 181a of the neutral stop arms. The brake 45 may be further depressed to rotate the shaft 192 to apply the brakes on the hydraulic motors (not shown), while the spring 205 smoothly pulls the lever 13 rearward to the neutral position. The fully depressed wheel brakes decrease the momentum of the tractor and prevent the motors from becoming pumps.

To turn the tractor either from a stationary position or from a forward moving position the operating lever 13 is turned in the direction of turning with the bearing ball 93 on the same side of the pivot axis C as lever 13 and opposite to the pintle arms 80 and 81. When the tractor is moving the pintle arm on the same side of the longitudinal plane as the direction of turning, it will be rotated a greater amount than the pintle arm on the opposite side of the longitudinal plane from the direction of rotation of lever 13. The pintle arm on the opposite side of rotation remains substantially stationary while the other pintle arm rotates to cause the wheel on that side to rotate slower than the other wheel. Thus a single wheel is changed in rotative speed for a smoother turning of the tractor. With the lever 13 forward in a driving position the pintle arm on the same side of the longitudinal plane as the direction of turning will be the pintle arm that is actuated while the other pintle arm remains substantially in position. Thus the connection of the levers 97 and 98 to pivot about the single-bearing ball 93 swings in the arc F on the opposite side of the axis C from the pintle arms providing a smooth and easy turning of the tractor. The spring 205 is under tension in the neutral and forward positions. This tension in addition to drawing the lever back in forward driving also returns a rotated shaft from a turned position to balance pumps.

On turning from a stationary position a slightly different action occurs. On turning the lever to the left the pin 170 engages the notch 180a and the lever 13 in addition to turning moves forwardly to rotate the pintle arm 181. The wheel 12 rotates turning the tractor to the left. The opposite occurs on turning the lever to the right.

The neutral stop arms 180 and 181 are pivotally mounted about the pins 182,183 on the opposite side of the pins 172,173 from the forward driving positions of the pintle arms. The neutral stop arms extend past pins 172,173 and are supported by bolts 180b, 181b engaging the top of the casting 50 so that the pins 172,173 engage the notches 180a and 181a on rearward movement. To drive the tractor in reverse the pedal 190 is depressed rotating the tubular shaft 191 and lifting the neutral stop arms 180 and 181 through the links 193 and 194. The notches are lifted clear of the pins and the lever 13 is moved rearwardly swinging the pintle arms 80,81 to the rear. The pedal 190 may be released and the neutral stop arms 180,181 will rest on the pins 172,173.

In reverse drive rotation the lever 13 will cause the tractor to turn in the opposite direction from the rotation of the handle 13. With the shaft 13 rearward and turned to the right, the pintle arm 81 on the same side of the longitudinal plane through the axis C will be rotated more than the pintle arm 80 on the opposite side of the plane. This will cause the right-hand wheel to turn faster and the tractor will turn to the left. However, as in forward turning a smooth rearward turning is produced since only one pintle arm is substantially moved to produce the turning action.

FEATURES OF THE INVENTION

It is thus seen from the foregoing description that the linkage mechanism with a single operating lever smoothly varies the speed or stops the tractor either in a forward or rearward movement and smoothly turns the tractor in either direction. The smooth stopping of the tractor in a forward movement is attained by providing a spring bias to the lever to pull the lever to the neutral position under a definite force and, at the same time, a braking of the tractor to prevent the pumps from becoming a motor which would oppose the smoothly return of the operating lever to the neutral position. Coupled with this smooth reduction in speed of the tractor is the smooth turning in either direction by holding one wheel substantially at the set speed while increasing or decreasing the other wheel.

A particular feature of the linkage mechanism is the prevention of the rearward movement of the pintle arms for reverse driving of the tractor. The neutral stop arms provide a positive blocking of this movement. In order to place the tractor in reverse, a positive release is required by the operator to lift the arms so that the tractor can be driven rearwardly.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In a mechanism controlling the front wheels of a tractor separately driven by two hydrostatic transmissions with pintle arms swinging in arcs on opposite sides of a longitudinal plane and in the same direction to vary the output of the pumps and motors in response to an operating lever pivotally mounted to move in the longitudinal plane and to rotate about a generally vertical axis in the longitudinal plane; single pivot means having an axis and mounted on said lever in offset relation to the lever axis to rotate about said lever axis on turning of said lever, links pivotally connected to said pivot means in overlapping relation to rotate about said pivot means axis and pivotally connected to a respective pintle arm to move a respective pintle arm through a longer arc when said pivot means is on one side of said longitudinal plane than the other so that on rotation of said operating lever one wheel changes in speed more than the other.

2. In a mechanism as set forth in claim 1, wherein said pivot means is on the opposite side of said operating lever axis from said pintle arms.

3. In a mechanism as set forth in claim 1, wherein a resilient member is provided connected to said operating lever to bias said lever to return to neutral when moved to a driving position.

4. In a mechanism as set forth in claim 3, wherein said resilient member returns said lever to a balanced condition when rotated either to left or right for left and right turning.

5. In a mechanism as set forth in claim 1, wherein said pivot means is a bearing ball and said links are attached to said bearing ball in overlapping relation to pivot about the same diameter of said bearing ball.

6. In a mechanism as set forth in claim 5, wherein said bearing ball is on the opposite side of said operating lever axis from said pintle arms.

7. In a mechanism as set forth in claim 3, wherein holding means and release means are provided, said holding means connected to said operating lever for frictionally retaining said lever in a given position and said release means connected to said holding means to actuate said holding means to release said lever and permit it to return to neutral under pressure of said resilient means.

8. In a mechanism as set forth in claim 1, wherein stop means and actuating means are provided said stop means pivotally mounted for engagement by said pintle arms on reverse movement and said actuating means connected to said stop means for pivotally moving said stop means clear of said pintle arms on reverse movement.

9. A speed and direction control mechanism for a tractor having two separately driven front wheels comprising two sets of hydraulic pumps and motors with said motors driving said respective wheels and said pumps connected to said respective motors for controlling the output of the motors respectively, said pumps having pintle arms movable in the same direction on opposite sides of a longitudinal plane and aligned at substantially the same level and rotatably mounted on said tractor, a rotatably mounted transversely extending pivot shaft, an operating lever mounted on said pivot shaft for pivoting with said shaft in the longitudinal plane and rotating about an axis in the longitudinal plane, ball pivot mounted on said lever to rotate with said lever on opposite sides of the longitudinal plane, ball pivots on said respective pintle arms, two links on opposite sides of the longitudinal plane and pivotally connected to said lever ball pivot and a respective pintle arm ball pivot to move a respective pintle arm on pivoting and rotating said lever to vary the outputs of said pumps, a brakedrum coupled to said pivot shaft, a brake band mounted on said drum, lever means pivotally mounted on said tractor and having attaching means connected to said ends of said brake band for tightening and loosening said brake band on said drum, a spring connected to said lever means to grip said brake band on said drum to retain said lever in any pivoted position and release means connected to said lever means to move said lever means to relieve said brake band from a gripping relation to permit free pivoting of said operating lever.

10. A mechanism for controlling the outputs of two hydrostatic transmissions separately driving the front wheels of a tractor in forward and reverse speeds comprising arms pivotally mounted on a respective transmission to vary the outputs thereof, operating lever means pivotally mounting to move in a vertical longitudinal plane and to rotate about an axis in said longitudinal plane, means for mounting said arms for movement in the same direction on opposite sides of the longitudinal plane to vary the outputs of said transmissions, links pivotally connected to said respective arm, means pivotally for connecting said links to said operating lever and rotating in an arc about said lever axis to produce a differential between the outputs of said transmissions on rotation of said operating lever, stop means movably mounted for engagement by said arms on movement from neutral to reverse and actuating means clearing said stop means from said arms so that said arms are swingable to reverse.

11. A mechanism for controlling the outputs of two hydrostatic transmissions separately driving the front wheels of a tractor in forward and reverse speeds comprising arms pivotally mounted on said respective transmissions to vary the outputs of said transmissions, operating lever means pivotally mounting to move in a vertical longitudinal plane and to rotate about an axis in said longitudinal plane, means for mounting said transmissions with said arms movable in the same direction on opposite sides of the longitudinal plane to similarly vary the outputs of said pumps, links pivotally connected to said respective arms and means pivotally connecting said links to said operating lever and rotating in an arc about said lever axis to produce a differential between the outputs of said pumps on rotation of said operating lever and spring means connected to said operating lever means to spring bias said operating lever means on positioning in forward speed.

12. A speed and direction control mechanism for a tractor having two separately driven front wheels comprising two sets of hydraulic pumps and motors with said motors driving said respective wheels and said pumps connected to said respective motors for controlling the output of the motors respectively, said pumps having pintle arms movable in the same direction on opposite sides of a longitudinal plane and aligned at substantially the same level and rotatably mounted on said tractor, a rotatably mounted transversely extending pivot shaft, an operating lever mounted on said pivot shaft for pivoting with said shaft in the longitudinal plane and rotating about an axis in the longitudinal plane, ball pivot mounted on said lever to rotate with said lever on opposite sides of the longitudinal plane, ball pivots on said respective pintle arms, two links on opposite sides of the longitudinal plane and pivotally connected to said lever ball pivot and a respective pintle arm ball pivot to move a respective pintle arm on pivoting and rotating said lever to vary the outputs of said pumps, said pintle arms each having a pin, stop members having notches for receiving said pins on movement of said arms to reverse position and having pivotal mountings to support said members in a pin-engaging position, and actuating means connected to said arms to raise said notches clear of said pins for moving said pintle arms to reverse drive.